United States Patent
Brown

(10) Patent No.: US 9,283,529 B2
(45) Date of Patent: Mar. 15, 2016

(54) SYSTEM AND REACTOR WITH BASKET FOR GAS GENERATION

(71) Applicant: Hydrogentech Energy Group, Toronto (CA)

(72) Inventor: Dana Brown, Toronto (CA)

(73) Assignee: Hydrogentech Energy Group, Toronto, CA (US)

( * ) Notice: Subject to any disclaimer, the term of this patent is extended or adjusted under 35 U.S.C. 154(b) by 548 days.

(21) Appl. No.: 13/719,331

(22) Filed: Dec. 19, 2012

(65) Prior Publication Data

US 2014/0170034 A1 Jun. 19, 2014

(51) Int. Cl.
- *B01J 7/00* (2006.01)
- *B01J 7/02* (2006.01)
- *C01B 3/08* (2006.01)

(52) U.S. Cl.
CPC ... *B01J 7/02* (2013.01); *C01B 3/08* (2013.01); *Y02E 60/36* (2013.01)

(58) Field of Classification Search
CPC .......... Y02E 60/36; Y02E 60/362; B01J 7/02; C01B 3/065
See application file for complete search history.

(56) References Cited

U.S. PATENT DOCUMENTS

| | | | |
|---|---|---|---|
| 3,928,441 A | 12/1975 | Hunter et al. | |
| 4,040,342 A * | 8/1977 | Austin | B01J 7/02 220/293 |
| 5,019,327 A | 5/1991 | Fanning et al. | |
| 6,899,862 B2 | 5/2005 | Baldwin et al. | |
| 7,037,483 B2 | 5/2006 | Suzuki et al. | |
| 7,179,443 B2 | 2/2007 | Schell et al. | |
| 7,493,765 B2 | 2/2009 | Akiyama et al. | |
| 7,815,870 B2 | 10/2010 | Lott et al. | |
| 7,951,349 B2 | 5/2011 | Kindler et al. | |
| 2001/0045364 A1 * | 11/2001 | Hockaday | B01D 19/0031 205/338 |
| 2004/0131541 A1 * | 7/2004 | Andersen | 423/657 |
| 2010/0150821 A1 * | 6/2010 | Bauch | C01B 3/065 423/648.1 |
| 2010/0172805 A1 * | 7/2010 | Kamitani | C01B 3/065 422/112 |
| 2010/0197879 A1 * | 8/2010 | De Broqueville | B01J 2/006 526/348 |

* cited by examiner

Primary Examiner — Imran Akram
(74) Attorney, Agent, or Firm — McMillan LLP

(57) ABSTRACT

A reactor for reacting a solid material in a solution to generate a gas including a vessel having a solution-containing portion and an air-containing portion; and a gas outlet through which the gas generated by the reaction of the solid material in the solution can be extracted, a solution disposed in the solution-containing portion, a solution permeable-container disposed in the air-containing portion of the vessel; the container holding the solid material, and means for displacing the container such that the solid material within the container is brought into contact with the solution. The solid material is typically aluminum bars and the solution is a sodium hydroxide solution. In one alternative, the means for displacing the container is replaced with a means for displacing the solution to be brought into contact with a stationary container.

13 Claims, 5 Drawing Sheets

SYSTEM AND REACTOR WITH BASKET FOR GAS GENERATION

FIELD OF THE INVENTION

The present invention relates generally to gas generating systems, and in particular to a hydrogen generating reactor and related system in which the hydrogen generating reactor may be used.

BACKGROUND OF THE INVENTION

Hydrogen is generally considered to be a clean fuel because in many applications, it can be burned to produce energy and water. That is, the waste product produced in generating energy from burning hydrogen is only water. Other problems persist in using hydrogen as a fuel though, including the ability to obtain or generate hydrogen in real time or to store it in sufficient quantities to be useful as a fuel.

Hydrogen furnaces are one example where it would be beneficial to use hydrogen as a fuel in heating a home or a building, for example. One problem that currently exists as a barrier to more widespread use is the delivery and storage of hydrogen gas to the building site. It is generally known in the art that hydrogen can be generated by reacting aluminum in a solution of water and sodium hydroxide, however, making use on a scale large enough to extract sufficient amounts of hydrogen for domestic or commercial use has been problematic.

Other similar reactions where a solid material is reacted with a liquid phase solution to produce a gas also face similar problems, in carrying out the reaction while extracting the gas in a useful and on-demand type of fashion.

Furthermore, some of the energy resulting from this reaction is often wasted as the target is to extract gas from the reaction. It may also be beneficial to make use of the heat byproduct, where it exists such as in the aluminum and sodium hydroxide reaction.

Accordingly, it is an object of the invention to provide a reactor for reacting a solid material such as aluminum in a solution, such as sodium hydroxide, to produce a gas.

SUMMARY OF THE INVENTION

According to one embodiment of the invention, there is disclosed a reactor for reacting a solid material in a solution to generate a gas including a vessel having a solution-containing portion and an air-containing portion; and a gas outlet through which the gas generated by the reaction of the solid material in the solution can be extracted, a solution disposed in the solution-containing portion, a solution permeable-container disposed in the air-containing portion of the vessel; the container holding the solid material, and means for displacing the container such that the solid material within the container is brought into contact with the solution.

According to one aspect of the invention, the solid material is aluminum (Al) and the solution includes sodium hydroxide (NaOH); the gas being hydrogen (H).

According to another aspect of the invention, the solution-permeable container comprises a basket.

According to another aspect of the invention, the means for displacing comprises a rod attached to opposite inner walls of the vessel; the basket including a rod-receiving portion sized, located and otherwise dimensioned such that the basket is rotatable around the rod; the basket, rod and bearings sized and otherwise dimensioned such that rotation of the basket brings the solid material into contact with the solution.

According to another aspect of the invention, the means for displacing comprises a rod fixedly attached proximate to a central axis of the basket; the rod disposed in bearings positioned at opposite inner walls of the vessel such that the rod is rotatable within the bearings to thereby rotate the basket; the basket, rod and bearings sized and otherwise dimensioned such that rotation of the basket brings the solid material into contact with the solution.

According to another aspect of the invention, tubing is disposed in the solution-containing portion; the tubing being sealed to the solution-containing portion and including a liquid therein, such that a liquid in the tubing is heated during the reaction.

According to another aspect of the invention, a sealable lid is disposed on a roof portion of the vessel; the lid providing access to an interior of the vessel and to the solution-permeable container.

According to another aspect of the invention, a release valve is provided on the reactor.

According to another aspect of the invention, an outlet pipe is provided in communication with the gas outlet and a vapour drain disposed on the pipe downstream of the gas outlet.

According to a second embodiment of the invention, there is provided a system including a reactor for reacting a solid material in a solution to generate the gas; the reactor comprising a vessel having a solution-containing portion and an air-containing portion; and a gas outlet through which the gas generated by the reaction of the solid material in the solution can be extracted, a solution disposed in the solution-containing portion, a solution permeable-container disposed in the air-containing portion of the vessel; the container holding the solid material and means for displacing the container such that the solid material within the container is brought into contact with the solution. The system further includes a gas storage vessel in fluid communication with the gas outlet for receiving and storing the gas.

According to an aspect of the second embodiment, the solid material is aluminum (Al) and the solution includes sodium hydroxide (NaOH); the gas being hydrogen (H).

According to another aspect of the second embodiment, the means for displacing comprises a rod attached to opposite inner walls of the vessel; the basket including a rod-receiving portion sized, located and otherwise dimensioned such that the basket is rotatable around the rod; the basket, rod and bearings sized and otherwise dimensioned such that rotation of the basket brings the solid material into contact with the solution.

According to another aspect of the second embodiment, the means for displacing comprises a rod fixedly attached proximate to a central axis of the basket; the rod disposed in bearings positioned at opposite inner walls of the vessel such that the rod is rotatable within the bearings to thereby rotate the basket; the basket, rod and bearings sized and otherwise dimensioned such that rotation of the basket brings the solid material into contact with the solution.

According to another aspect of the second embodiment, tubing is disposed in the solution-containing portion of the reactor; the tubing being sealed to the solution-containing portion and including a liquid therein, such that a liquid in the tubing is heated during the reaction.

According to another aspect of the second embodiment, an outlet pipe is provided in communication with the gas outlet connecting the gas outlet and the gas storage vessel; and a vapour drain is disposed on the pipe.

According to another aspect of the second embodiment, the tubing extends out of the reactor and to an infloor heating system.

According to another aspect of the second embodiment, a gas boiler is provided between the reactor and the infloor heating system to further heat the liquid in the tubing.

According to another aspect of the second embodiment, a gas furnace is provided in fluid communication with the gas storage vessel.

According to a third embodiment of the invention, there is provided a reactor for reacting a solid material in a solution to generate a gas including a vessel having a solution-containing portion and an air-containing portion; and a gas outlet through which the gas generated by the reaction of the solid material in the solution can be extracted, a solution disposed in the solution-containing portion, a solution permeable-container disposed in the air-containing portion of the vessel; the container holding the solid material, and means for displacing the solution such that the solution is brought into contact with the solid material.

According to an aspect of the third embodiment, the means for displacing includes a fluid inlet provided in the air-containing portion above the solution-permeable container, a fluid outlet provided below the solution-permeable container and means for circulating the solution into and out of the vessel via the fluid inlet and the fluid outlet, whereby the solution comes into contact with the solid material as the solution passes from the fluid inlet to the fluid outlet.

According to a fourth embodiment of the invention, there is provided a system including a reactor for reacting a solid material in a solution to generate the gas; the reactor comprising a vessel having a solution-containing portion and an air-containing portion; and a gas outlet through which the gas generated by the reaction of the solid material in the solution can be extracted, a solution disposed in the solution-containing portion, a solution permeable-container disposed in the air-containing portion of the vessel; the container holding the solid material, and means for displacing the solution such that the solution is brought into contact with the solid material. The system further includes a gas storage vessel in fluid communication with the gas outlet for receiving and storing the gas.

According to an aspect of the fourth embodiment, the means for displacing includes a fluid inlet provided in the air-containing portion above the solution-permeable container, a fluid outlet provided below the solution-permeable container and means for circulating the solution into and out of the vessel via the fluid inlet and the fluid outlet, whereby the solution comes into contact with the solid material as the solution passes from the fluid inlet to the fluid outlet.

According to another aspect of the fourth embodiment, a solution holding tank is provided in fluid communication with the fluid inlet and the fluid outlet, and a circulation pump for circulating the solution from the solution holding tank into the vessel where the solution contacts the solid material and subsequently out of the vessel via the solution outlet back into the solution holding tank.

BRIEF DESCRIPTION OF THE DRAWINGS

Embodiments will now be described, by way of example only, with reference to the attached Figures, wherein.

DETAILED DESCRIPTION OF THE EMBODIMENTS

Figure 1A:
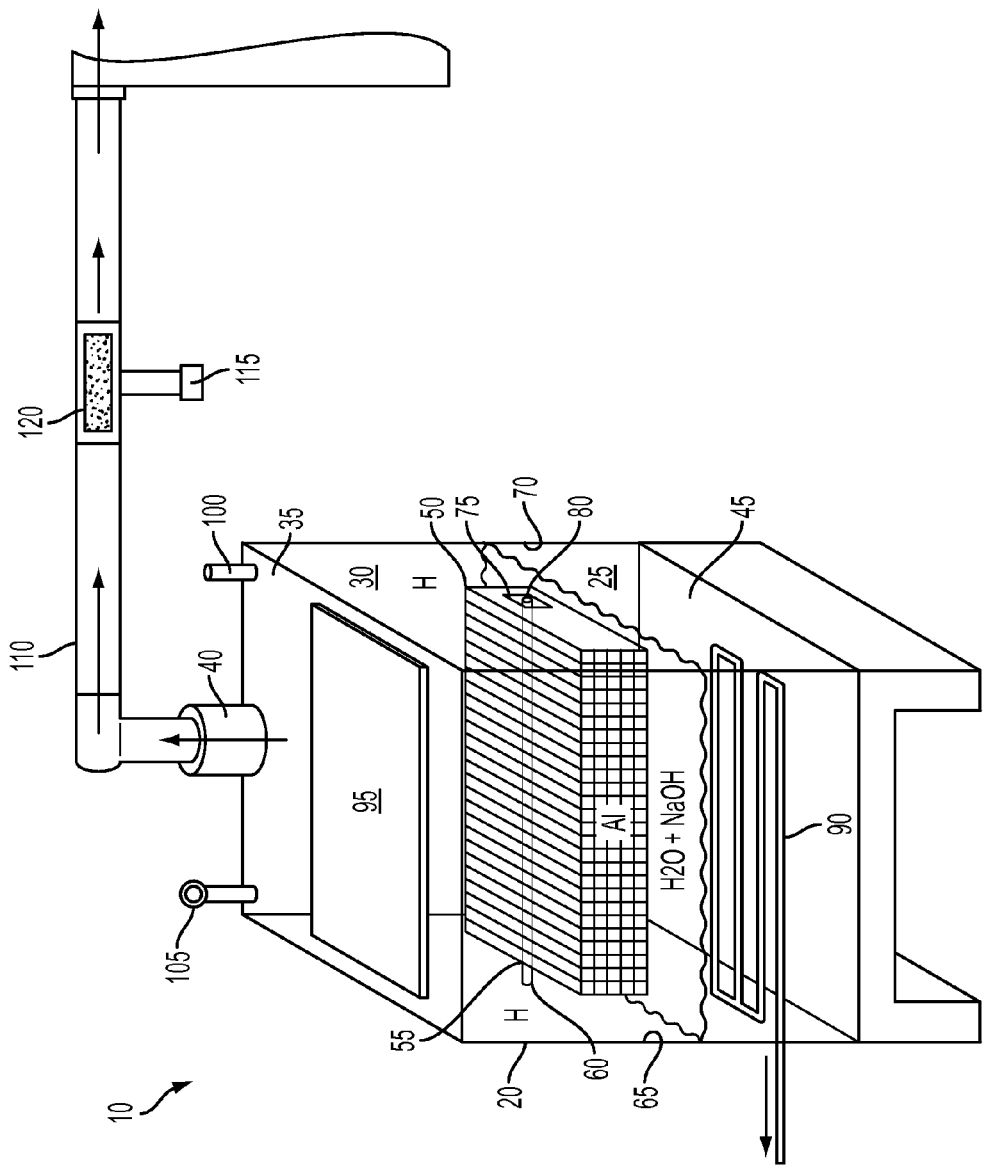
FIGS. 1a and 1b show a reactor according to one embodiment of the invention.

Referring now to FIG. 1, there is shown one embodiment of the invention in which a reactor 10 for reacting a solid material in a solution to generate a gas is shown. In the exemplary embodiment and typically described throughout, the solid material is aluminum and preferably solid aluminum bars, and the solution includes sodium hydroxide. The gas resulting from this exemplary reaction is hydrogen. This reaction is known in the art, and other variations on it are also contemplated. One example of a preferred reaction is described in "Reaction of Aluminum with Alkaline Sodium Stannate Solution as a Controlled Source of Hydrogen" by Dai et al. published at *Energy Environ. Sci.*, 2011, 4, 2206. The reactor 10 may be made of any suitable material, including stainless steel, and may be provided with a stand 15 on a base thereof for ease of positioning and stability.

More substantively, the reactor 10 includes a vessel 20 having a solution-containing portion 25 and an air-containing portion 30 that is located between the solution-containing portion 25 and a roof 35 of the vessel 20. Preferably position on the roof 35 is a gas outlet 40 through which hydrogen generated in the reactor can be extracted. In the preferred embodiment, the sodium hydroxide solution is disposed in the solution-containing portion 25 of the vessel 20. The solution-containing portion 25 may be defined as that portion of the vessel 20 from its base 45 to a height of the vessel 20 at which sufficient amounts of the sodium hydroxide solution can be held to permit the functioning as described below. Typically, at least 50% of the vessel 20 will contain the sodium hydroxide solution, but this amount can range from between 25% to 75% in preferred embodiment. These figures are presented as examples only, and the invention is not to be limited as such. Furthermore, solution amounts outside of this range may also be appropriate. The air-containing portion 30 is defined as that portion of the vessel 20 between a top surface of the liquid-containing portion 25 and the roof 35.

A solution-permeable container 50 is disposed in the air-containing portion 30 of the vessel 20. The aluminum, preferably in the form of aluminum bars, are disposed within the solution-permeable container 50. The container 50 is preferably a stainless steel basket 50 then when submerged, or partially submerged in the sodium hydroxide solution, permits the aluminum bars within the basket to be brought into contact with the sodium hydroxide and thus providing for the hydrogen generating reaction. To this end, a means for displacing 55 the container such that the aluminum bars within the basket 50 are brought into contact with the sodium hydroxide solution. The basket 50 is openable such that aluminum bars within the basket can be added as appropriate.

Figure 1B:
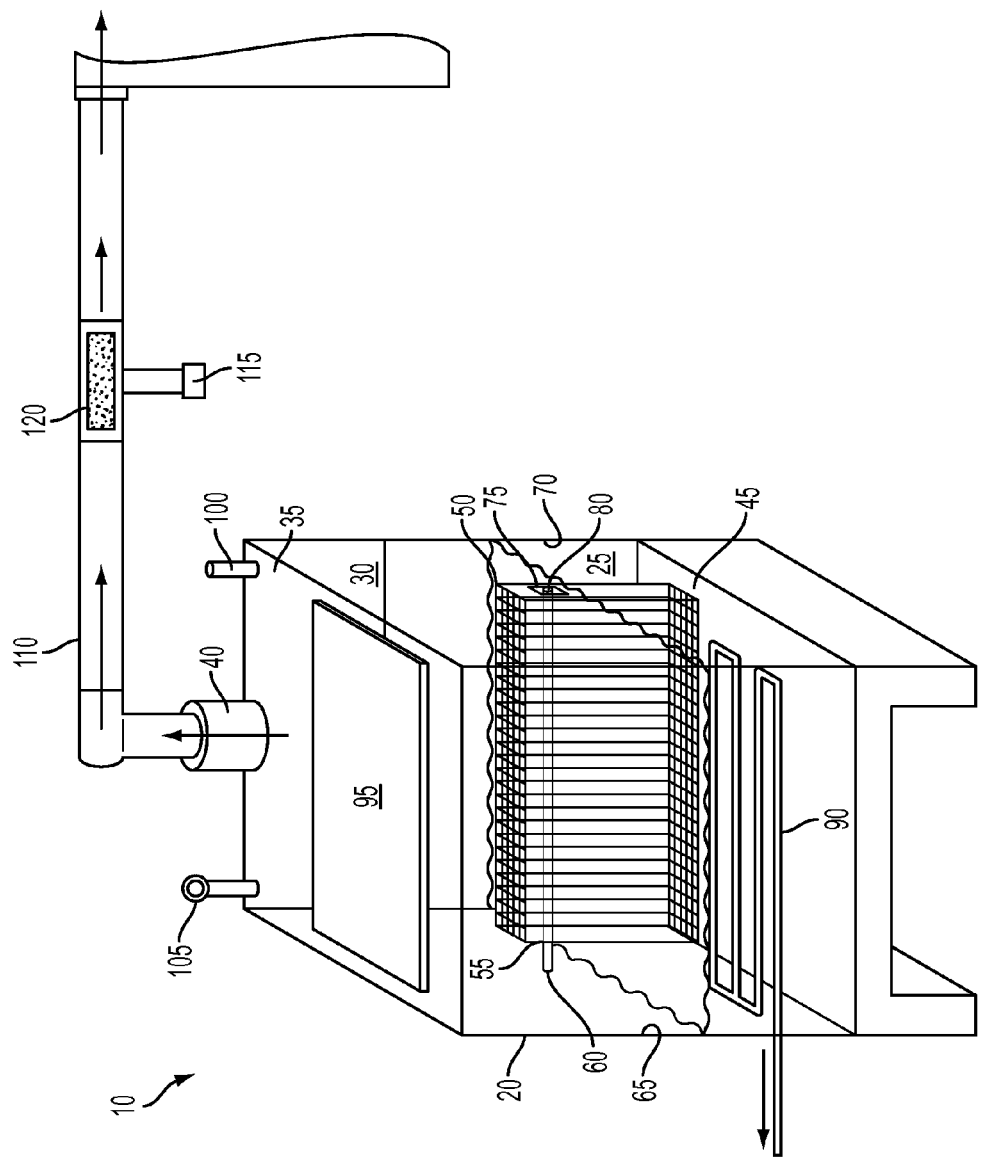

In one example, the means for displacing 55 includes a rod 60 attached to opposite inner walls 65, 70 of the vessel 20. The basket 50 includes a rod-receiving portion 75 that is sized, located and otherwise dimensioned such that the basket 50 is rotatable around the rod 60. The basket 50 and rod 60 are all sized and otherwise dimensioned such that the basket 50 brings the aluminum into contact with the sodium hydroxide when it is rotated, as shown in FIG. 1b. Particular details of implementation or the hardware selected are not considered to be essential elements of the invention. However, as will now be appreciated by a person skilled in the art, the reaction can be initiated on-demand by rotating the basket 50 bringing the aluminum into contact with the sodium hydroxide solution, and extracting the resultant hydrogen via the air outlet. The basket 50 can be rotated in any number of ways, including and not limited to, a motor connected to the rod from the exterior of the vessel. Implementation details of how the rod is rotated, or the motor controlled are not pertinent to the inventive concept of the invention.

Alternatively, rather than having the basket 50 rotate about the rod 60, the rod 60 may be disposed in bearings 80 positioned at opposite inner walls of the vessel such that the rod is rotatable within the bearings to thereby rotate the basket 50. In this alternative, the basket 50, rod 60 and bearings 80 are each sized and otherwise dimensioned such that rotation of the basket brings the aluminum material into contact with the sodium hydroxide solution. In addition, if agitation of the sodium hydroxide solution is desired, the rod can be continuously rotated to produce this agitation.

In another aspect of the invention, closed tubing 90, such as stainless steel tubing, is disposed in the solution-containing. The tubing 90 is sealed with respect to the sodium hydroxide solution and may be adapted to contain a liquid therein. In this manner, the liquid within the tubing can be heated by the heat byproduct generated during the reaction in the vessel. The heated liquid in the tubing can be extracted from the reactor and used in any number of ways, one example of which will be described below.

A closeable, and preferably sealable, lid 95 may be provided on the roof 35 of the vessel 20. The lid 95 provides access to an interior of the vessel 20 to replace the aluminum bars, for example. Also optionally located on the roof 35 is a release valve 100, and a pressure gauge 105 to safeguard against a buildup of hydrogen gas within the reactor.

Extending from the gas outlet 40 is an outlet pipe 110, and a vapour drain 115 downstream from the gas outlet 40. The vapour drain 115 captures any vapour that is also extracted from the reactor prior to storing the hydrogen gas as will be described below. A dryer, such as a silicon dryer 120 may be used to aid in the extraction of vapour at the vapour drain 115.

Figure 2:
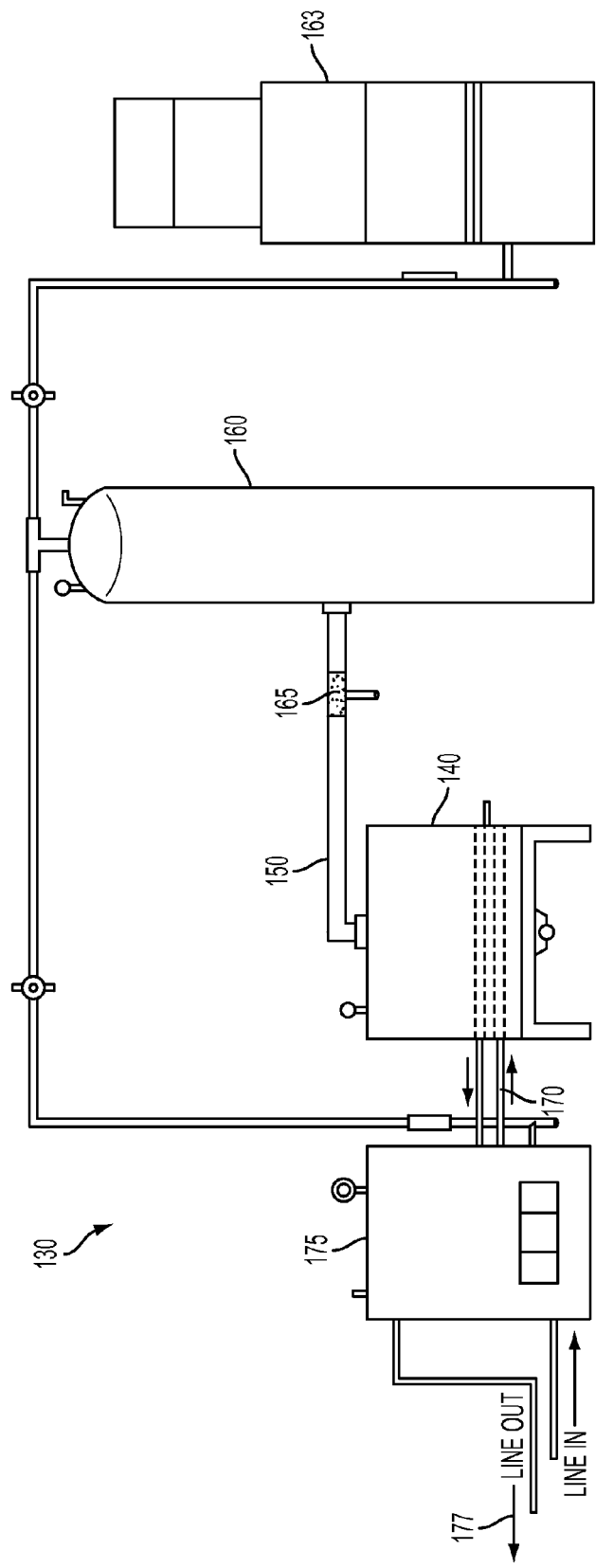
FIG. 2 is a schematic drawing showing a gas generating system using the reactor of FIG. 1 according to another embodiment of the invention.

Referring now to FIG. 2, there is shown a system 130 in which the reactor as herein described may be used. The system 130 includes a reactor 140 for reacting solid aluminum material in a sodium hydroxide solution. The reactor 140 may be any reactor as herein described. In communication with a hydrogen outlet 150 from the reactor is a hydrogen storage tank 160. Hydrogen storage tank 160 is any pressure vessel known in the art capable of storing hydrogen gas. An in-line dryer 165 may be positioned between an outlet of the reactor 140 and an inlet of the storage tank 160. Hydrogen stored in the tank 160 may be used to power a hydrogen furnace 163.

As described above, the reactor 140 may included liquid-containing tubing 170 that is otherwise sealed to 14. The liquid in the tubing 170 may benefit from the heat generated during the hydrogen producing reactor to thus warm the liquid. Where this is the case, the system may further include a boiler 175, such as a hydrogen boiler to further heat the liquid, which may then be use for infloor heating 177, for example. In this system, both the hydrogen that results from the reaction and the heat byproduct is used in a residential environment, to power a furnace and aid in infloor heating.

The system as described is easy to use, and generally only requires adding aluminum bars to the basket, or other holding element within the reactor. The reactor may also be provided with inputs and outputs for filling the reactor with the sodium chloride, or similar solution and subsequently draining same.

Figure 3:
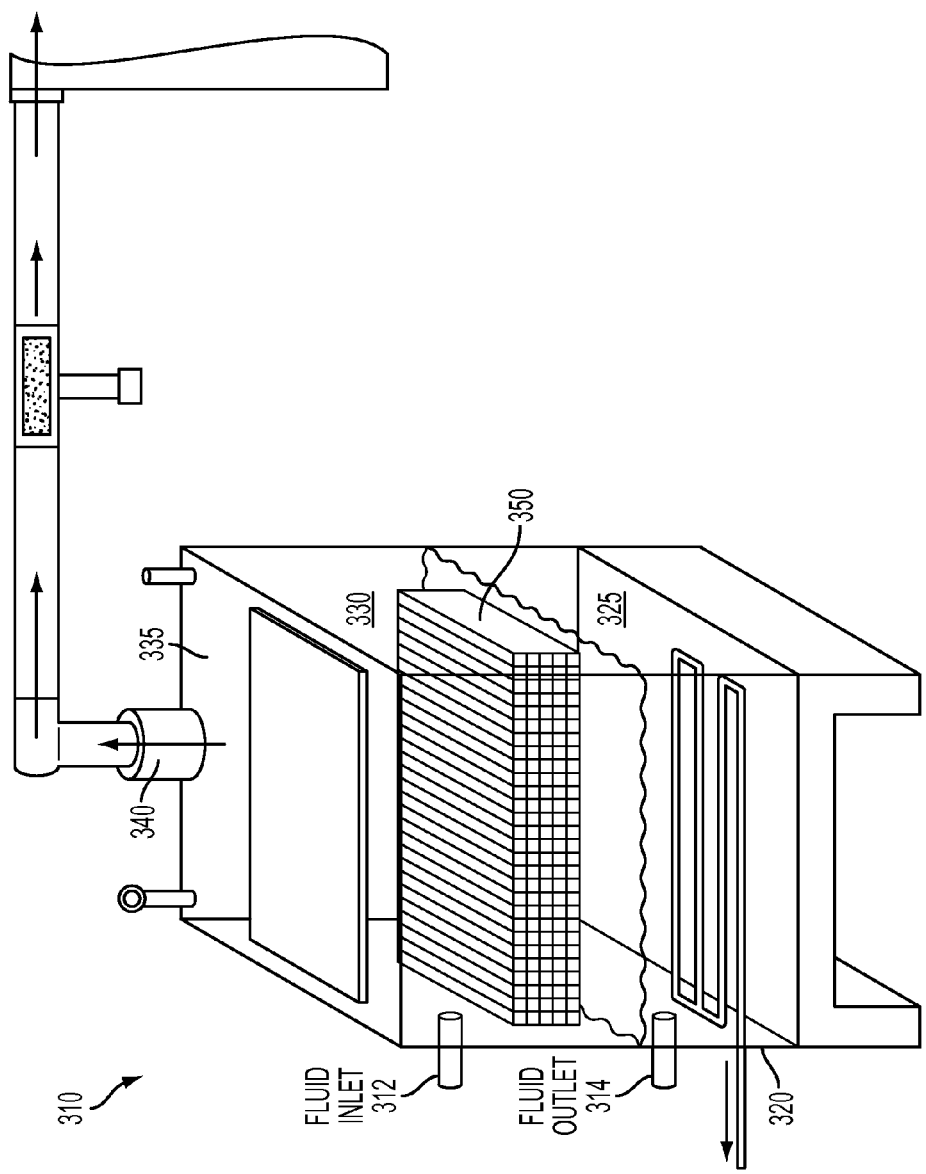
FIG. 3 shows a reactor according to a second embodiment of the invention.
Figure 4:
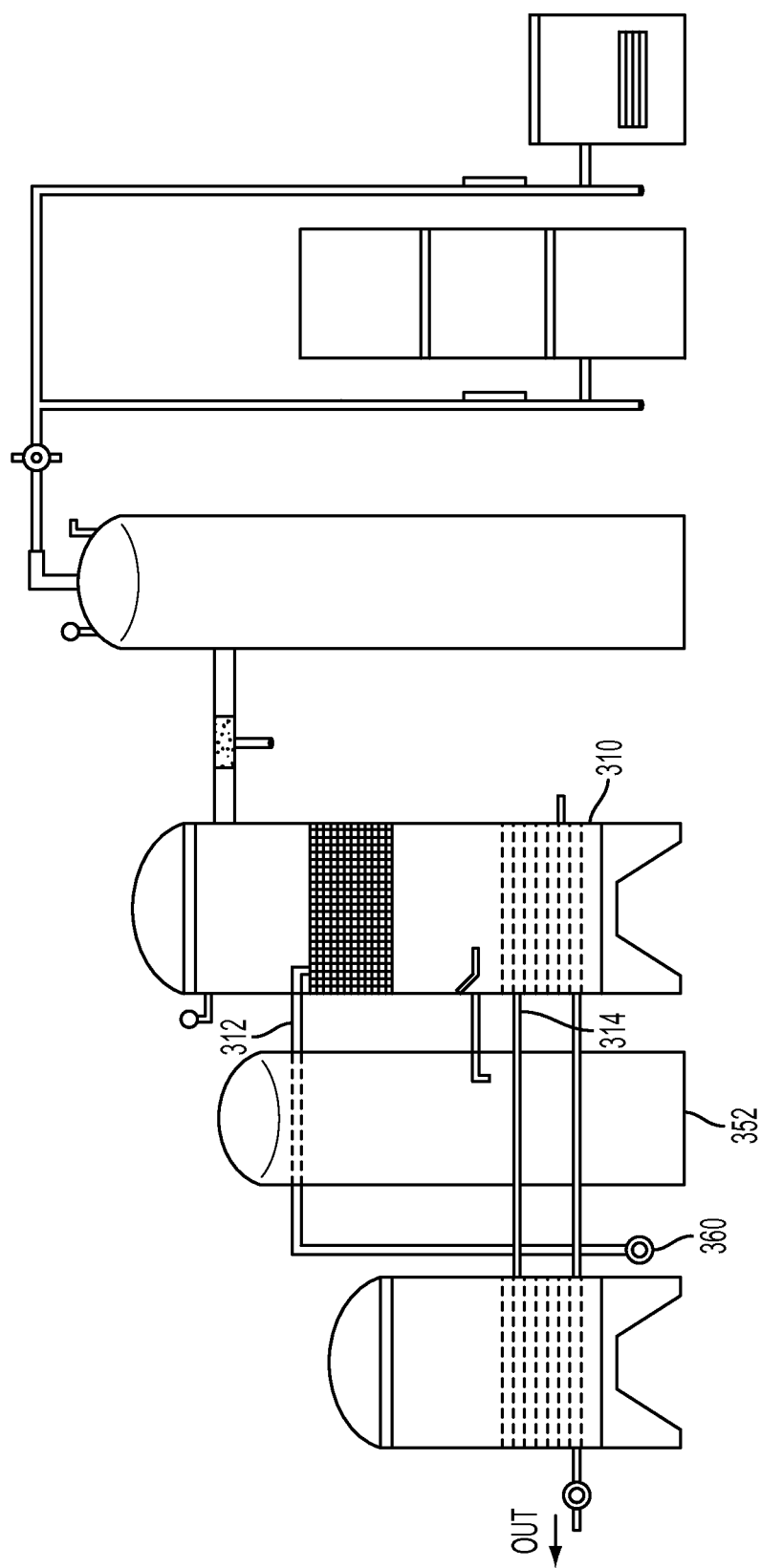
FIG. 4 is a schematic drawing showing a system using the reactor of FIG. 3.

Another embodiment of the invention is shown in FIG. 3. The reactor 310 of this embodiment includes a vessel 320 having a solution-containing portion 325 and an air-containing portion 330 that is located between the solution-containing portion 325 and a roof 335 of the vessel 320. Preferably positioned on the roof 335 is a gas outlet 340 through which hydrogen generated in the reactor can be extracted. A solution-permeable container 350 is disposed in the air-containing portion 330 of the vessel 320. The aluminum bars, are disposed within the solution-permeable container 350. The container 350 is preferably a stainless steel basket 350 through which the sodium hydroxide solution can be passed, either continuously or intermittently and on demand. To accomplish this, the system in which the reactor 310 is used also includes a solution holding tank 352 in fluid communication with the reactor 310 via one or more inlet fluid lines 312 and one or more outlet fluid lines 314. A control float 355 may be provided to monitor the level of sodium hydroxide within the vessel 320. Furthermore, a circulation pump 360 is provided to provide for the continuous or intermittent pumping of sodium hydroxide to the reactor. The basket 350 may be attached to inner walls of the vessel 320 in any manner known in the art, such as by welding or using known fasteners.

The reactor of this other embodiment may similarly be used in the system as described above, accounting for the solution holding tank 352 also in fluid communication with vessel 320. Other features as described, including the liquid-containing tubing for optional use with infloor heating and the hydrogen furnace are as described above. In addition, the generated hydrogen may also be used to power an electric generator as illustrated.

In use, a system operator would replace the aluminum bars as they are used and ensure sufficient amounts of sodium hydroxide solution is available in the system. As either of these are depleted, they are easily replenished through the lid on the reactor, for example. Thus, the reactor and system of the invention addresses one or more of the problems associated with the prior art, and provides for an efficient, easy to use and reliable source of hydrogen gas.

While applicant has illustrated and described a schematic view of the system and the reactor, it will be understood by a person skilled in the art that details of implementation, such as pipe sizes, mechanical connections, fluid connections, sealing and sizing of components are generally considered within the purview of a person skilled in the art. Furthermore, construction details of the vessel, and other elements of the system are not material to the invention at hand, and off-the-shelf or known pressure vessels may readily be used and modified as described herein to aid in putting the invention into practice.

The invention claimed is:

1. A reactor for reacting a solid material in a solution to generate a gas comprising:
    a vessel having a solution-containing portion, an air-containing portion, inner walls, and a gas outlet through which said gas generated by the reaction of said solid material in said solution can be extracted; said solution disposed in said solution-containing portion;
    a solution permeable-container disposed in said air-containing portion of said vessel; said container holding said solid material; and
    means for displacing said container such that said solid material within said container is brought into contact with said solution;
    wherein said solution-permeable container comprises a basket rotatably affixed to the inner walls of said vessel; and
    wherein said means for displacing comprises a rod attached to opposite inner walls of said vessel; said basket including a rod-receiving portion sized, located and otherwise dimensioned such that said basket is rotatable around said rod; said basket, rod and bearings sized and otherwise dimensioned such that rotation of said basket brings said solid material into contact with said solution.

2. The reactor according to claim 1, wherein said solid material is aluminum (Al) and said solution includes sodium hydroxide (NaOH); said gas being hydrogen (H).

3. The reactor according to claim 1, further comprising tubing disposed in said solution-containing portion; said tubing being sealed to said solution-containing portion and including a liquid therein, such that a liquid in said tubing is heated during said reaction.

4. The reactor according to claim 1, further comprising a sealable lid disposed on a roof portion of said vessel; said lid providing access to an interior of said vessel and to said solution-permeable container.

5. The reactor according to claim 1, further comprising a release valve.

6. The reactor according to claim 1, further comprising an outlet pipe in communication with said gas outlet and a vapour drain disposed on said pipe downstream of said gas outlet.

7. The system according to claim 1, further comprising a gas furnace in fluid communication with said gas storage vessel.

8. A system comprising:
   a reactor for reacting a solid material in a solution to generate the gas, the reactor comprising:
      a vessel having a solution-containing portion, an air-containing portion, inner walls, and a gas outlet through which said gas generated by the reaction of said solid material in said solution can be extracted;
      a solution disposed in said solution-containing portion;
      a solution permeable-container disposed in said air-containing portion of said vessel; said container holding said solid material; and
      means for displacing said container such that said solid material within said container is brought into contact with said solution;
   wherein said solution-permeable container comprises a basket rotatably affixed to the inner walls of said vessel; and
   wherein said means for displacing comprises a rod attached to opposite inner walls of said vessel; said basket including a rod-receiving portion sized, located and otherwise dimensioned such that said basket is rotatable around said rod; said basket, rod and bearings sized and otherwise dimensioned such that rotation of said basket brings said solid material into contact with said solution;
   a gas storage vessel in fluid communication with said gas outlet for receiving and storing said gas.

9. The system according to claim 8, wherein said solid material is aluminum (Al) and said solution includes sodium hydroxide (NaOH); said gas being hydrogen (H).

10. The system according to claim 8, further comprising tubing disposed in said solution-containing portion of said reactor; said tubing being sealed to said solution-containing portion and including a liquid therein, such that a liquid in said tubing is heated during said reaction.

11. The system according to claim 8, further comprising an outlet pipe in communication with said gas outlet connecting said gas outlet and said gas storage vessel; and a vapour drain disposed on said pipe.

12. The system according to claim 10, wherein said tubing extends out of said reactor and to an infloor heating system.

13. The system according to claim 12, further comprising a gas boiler between said reactor and said infloor heating system to further heat said liquid in said tubing.

* * * * *